INVENTORS
George Markus
Martin Siegel
BY
ATTORNEYS

United States Patent Office 2,723,477
Patented Nov. 15, 1955

2,723,477

METHOD OF MAKING AN ORNAMENTED PLASTIC SHEET ASSEMBLY AND ARTICLES THEREOF

George Markus, West Orange, N. J., and Martin Siegel, Roslyn, N. Y., assignors to Aristocrat Leather Products, Inc., New York, N. Y., a corporation of New Jersey Application November 24, 1954, Serial No. 471,046

8 Claims. (Cl. 41—34)

This invention relates generally to a method of making an ornamented plastic sheet assembly.

The primary aim and object of the present invention is to simplify the art of ornamenting plastic sheet material and articles and to reduce the cost of manufacture of such ornamented plastic sheet material and articles. Pursuant to this object of the present invention plastic sheet material is ornamented by having ornamental elements secured thereto in a preselected decorative arrangement by a mechanical securing operation.

Another object of the present invention is the provision of a method of making an ornamented plastic sheet assembly by mechanically securing ornaments to plastic sheet material by the application of heat externally of said material.

Yet another object of the present invention is the provision of a generally improved method of the above character which can be practiced by the utilization of conventional apparatus in the main.

While we have shown and described the preferred embodiments of our invention, it will be understood that various changes may be made in the idea or principles of the invention within the scope of the appended claims.

In the drawing which illustrates the best modes now contemplated by us for carrying out our invention:

Figure 1:
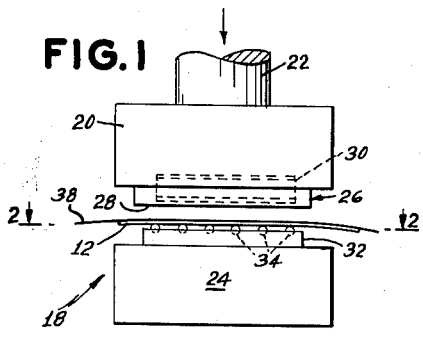
Fig. 1 is a side elevational view of a heat press showing ornamental elements and plastic sheet material positioned on the bed thereof preparatory to the securing operation.

Referring to the drawing and more particularly to Figs. 1 through 6 thereof, there is shown an ornamented plastic sheet assembly 10 which comprises a sheet 12 of thermoplastic resinous material having ornamental elements 46, formed of thermoplastic resinous material, secured thereto in a preselected spacing arrangement, said ornamented plastic sheet assembly being formed by securing the ornamental elements 14 to the plastic sheet material 12 by the method to be described in detail hereinafter. The apparatus 18 shown in Fig. 1, utilized for the practice of the present invention, is conventional in the main and includes a head 20, mounted at the end of a vertically reciprocable ram 22, and a stationary bed 24, it being understood that the ram 22 is mounted for vertical reciprocation in any suitable manner whereby to vertically reciprocate the head 20 relative to its companion stationary bed 24. Mounted on the lower end of the head 20, in any suitable manner, is a die 26 which has a lower planar face 28, said die face being adapted to mechanically secure the ornamental spherical elements 14 to the plastic sheet material 12 in the manner to be described hereinafter. The ornamental elements 14 are adapted to be secured to the plastic sheet material 12 by heat applied externally of said plastic sheet material, there being provided any suitable heating means 30 in the head 20 of apparatus 18 for heating the die 26 to the desired operating temperature.

Figure 2:
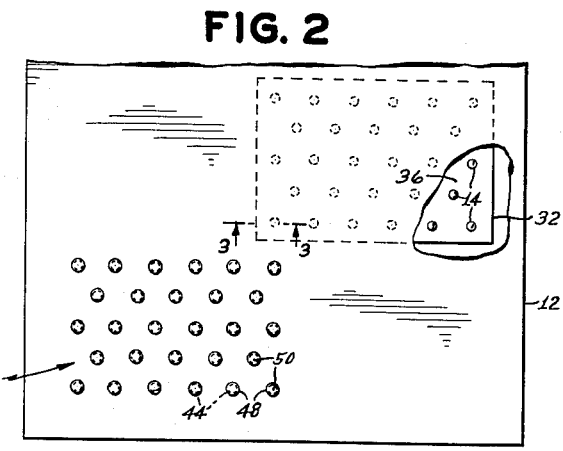
Fig. 2 is a view, on an enlarged scale, taken on the line 2—2 of Fig. 1.
Figure 3:
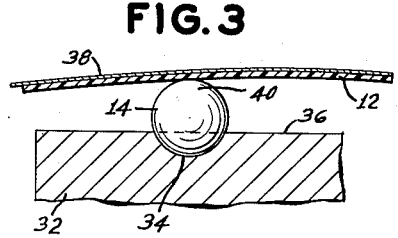
Fig. 3 is a sectional view, on a greatly enlarged scale, taken on the line 3—3 of Fig. 2.
Figure 4:
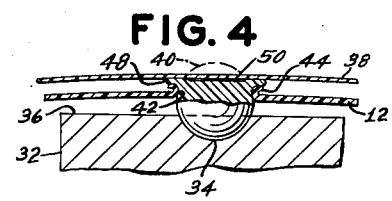
Fig. 4 is a view similar to Fig. 3 subsequent to the securing operation.
Figure 5:
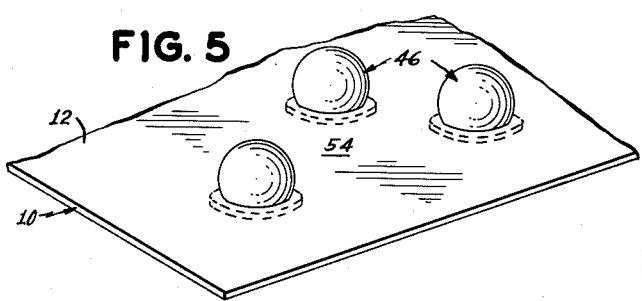
Fig. 5 is a fragmentary perspective view of the ornamented plastic sheet assembly.
Figure 6:
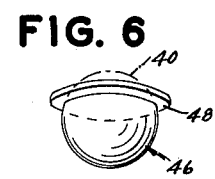
Fig. 6 is a perspective view of an ornamental element after being subjected to the securing operation.

Disposed on the bed 24 of apparatus 18 is a suitable retainer 32 which is provided with a series of recesses 34 which are formed complementary to the contour of the ornamental elements 14, it being apparent that the recesses 34 may have any desired spacing arrangement corresponding to the spacing of the ornamental elements 46 of the ornamental plastic sheet assembly 10. The recesses 34 are of relatively shallow formation so that the retainer 32 supports the plastic ornaments 14 with the major portion of said ornaments projecting upwardly of the face 36 of said retainer. In the illustrated embodiment, the ornaments 14 are of spherical configuration and the recesses 34, which are of complementary configuration, are adapted to support the ornaments so that approximately two-thirds of the latter project upwardly from the face 36 of the retainer. After the plastic ornaments 14 are positioned in the shallow spherical recesses 34 for support by the retainer 32, the plastic sheet material 12 is superposed on said ornaments, as shown in Figs. 1 through 3, and the heated die face 28 is applied to the surface of said sheet material with a parting agent disposed between said die face and said sheet material. The parting agent is constituted by a thin sheet of thermal conducting material, for example the sheet of aluminum foil 38, the latter constituting a parting agent between the die 26 and the plastic sheet material 12 and being effective to conduct heat to the ornamental elements 14 and sheet material 12 during the securing operation. Thus the sheet of aluminum foil 38 is disposed between the work to be secured and the face 28 of the die 26 and the ram 22 is reciprocated in a downward direction so as to reciprocate the die face 28 into operative engagement with said work. The engagement of the heated die face with the sheet of aluminum foil 38 and the plastic sheet material 12 provides for the penetration of the upper portions 40 of the ornaments 14 through said sheet material to form openings 42 through the latter having peripherally extending curled-over portions 44. The heated die 26 also provides for the flattening and upsetting of the ornament portions 40 to form the finished flattened spherical ornament 46, the latter having a peripherally extending rim portion 48 which is upset or headed over the curled-over portions 44 as best shown in Fig. 4. Thus the die 26 when reciprocated into operative engagement with the work disposed on the bed 24 will be effective to provide for the penetration of the ornament portions 40 through the sheet material 12 to form openings through the latter and to upset said portions 40 whereby the ornament 46 will have generally flat inner faces 50 and peripherally extending rim portions 48 which overlie the peripherally extending curled-over portions 44. Thus the die 26 provides the requisite amount of heat and pressure for the penetration of the ornament portions 40 through the sheet material 12 whereby to form a mechanical securement between the ornaments 46 and said sheet material with said ornaments being disposed in a preselected spacing arrangement corresponding to the spacing arrangement of the ornamental elements 14 on the retainer 32. It will be understood that the ornamental elements 14 and the plastic sheet material 12 will be of thermoplastic material whereby to provide for the penetration and upsetting of the ornamental elements relative to said sheet material on the application of the die face 28 to the work.

While the sheet 12 of the illustrated embodiment is formed of thermoplastic material, it will be understood that the method of the present invention may be practiced by the use of sheet material other than thermoplastic sheet material, for example thermosetting plastic sheet material in which case the latter would be provided with preformed openings corresponding to the openings 42 formed by the penetration of the spherical ornamental elements 14 through the plastic sheet material. Thus where the sheet 12 if formed of thermoplastic material it is unnecessary to provide preformed openings therethrough whereas if non-thermoplastic sheet material is utilized it is necessary to preform openings through such material. It is to be understood that the ornamental elements 46 are secured to the plastic sheet material 12 by a mechanical securement as distinguished from a bonding operation in which the component elements are fused together. The plastic sheet material 12 may be of any desired contour, determinate or indeterminate, a completed ornamented area of said sheet material being shown at 52 in Fig. 2. The ornamental elements 46 may be of any desired configuration and may be disposed on the plastic sheet material 12 in any desired spacing arrangement so as to achieve the decorative effect desired. The ornamented plastic sheet assembly 10 may be used in any desired application, for example in the fabrication of wallets, vanity articles and the like. In the illustrated embodiment the face 54 of the ornamented assembly 10 constitutes the outer face or right side of the assembly and the latter will be of aesthetically attractive appearance achieving the effect of pearls secured thereto.

Figure 7:
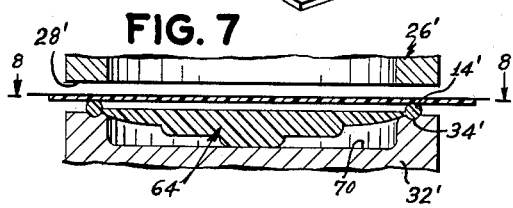
Fig. 7 is a view similar to Fig. 3 illustrating another embodiment of the present invention.
Figure 9:
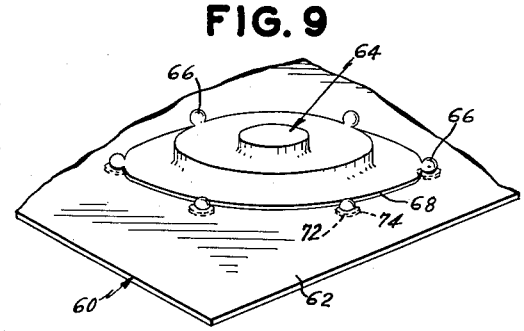
Fig. 9 is a view similar to Fig. 5 according to the form of invention illustrated in Figs. 7 and 8.
Figure 8:
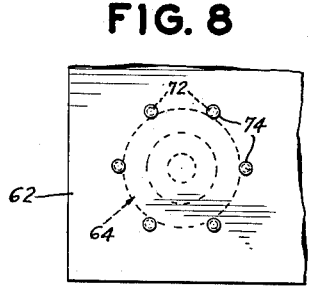
Fig. 8 is a view taken on the line 8—8 of Fig. 7.

With reference to Figs. 7, 8 and 9, there is shown another embodiment of the present invention which is similar to the form of the invention described above except in the respects to be pointed out in detail hereinafter. The ornamented plastic sheet assembly 60 comprises plastic sheet material 62 having an ornament 64 mechanically secured thereto by means of the ornamental elements 66 which are peripherally spaced around the rim 68 of said ornament, said elements 66 corresponding to the elements 14 described above and being adapted to penetrate and be upset to provide for the securement of said ornament to the plastic sheet material 62 which corresponds to the plastic sheet material 12. The retainer 32' is provided with a series of shallow recesses 34' spaced corresponding to the spacing of the spherical elements 14' of the ornament 64 and being of a configuration complementary to said elements. The retainer 32' is provided with a dished or recessed portion 70 for the reception of the ornament 64 during the securing operation. The die 26', which corresponds to the die 26 described above, is of annular formation whereby the die face 28' will register with the elements 14' during the securement operation in which the die face 28' is reciprocated into operative engagement with the work constituted by the plastic sheet material 62 and the ornament 64. The die face 28' coacts with the elements 14' and the sheet material 62 in the manner described above in detail whereby to provide for the penetration of such elements through said sheet material to form openings through the latter having peripherally extending curled-over portions corresponding to the portions 44 described above and to provide for the upsetting of said elements to the flattened spherical condition 66 with said elements having flattened inner faces 72 and peripherally extending rim portions 74 which overlie said curled-over portions. Thus the securing operation will be effective to form the elements 14' into the condition 66 which corresponds to the ornaments 46 described above except that the ornamental elements 66 form a peripheral part of the ornament 64. Thus the ornamental elements 66 provide for the securement of the ornament 64 to the plastic sheet material 62 and said ornamental elements correspond to the flattened spherical elements 46 of the previously described embodiment. It will be understood that the ornament 64 may be of any desired configuration, may be ornamented in any desired manner, and may be formed of any suitable material.

While we have shown and described the preferred embodiments of our invention, it will be understood that various changes may be made in the idea or principles of the invention within the scope of the appended claims.

Having thus described our invention, what we claim and desire to secure by Letters Patent is:

1. A method of making an ornamented sheet assembly, comprising the steps of placing thermoplastic resinous sheet material and an ornament formed of thermoplastic resinous material in superposed relation, applying pressure thereto in a direction to urge said sheet material and ornament into interengagement and heating said sheet material at the outer surface thereof by externally generated heat thereby automatically forming an aperture in said sheet material to provide for the extension of a portion of said ornament through said formed aperture of the sheet material, and upsetting said portion over said sheet material about said aperture whereby to form a mechanical securement between said ornament and said sheet material.

2. A method of making an ornamented plastic sheet assembly, comprising the steps of placing thermoplastic resinous sheet material and an ornament formed of thermoplastic resinous material in superposed relation, and applying pressure thereto to urge said sheet material and ornament into interengagement and heating said sheet material at the outer surface thereof by externally generated heat thereby automatically forming an opening through said sheet material having a peripherally extending curled-over portion to provide for the penetration of a portion of said ornament through said formed opening and upsetting said penetrating portion over said curled-over portion whereby to form a mechanical securement between said ornament and said plastic sheet material.

3. A method of making an ornamented plastic sheet assembly, comprising the steps of supporting an ornament formed of thermoplastic resinous material in a retainer so that a portion thereof projects upwardly of said retainer, superposing thermoplastic resinous sheet material on said ornament, applying a heated die to the outer surface of said sheet material with a heat conducting parting agent disposed therebetween to provide for the automatic formation of an aperture in the sheet material and for the penetration of a portion of said ornament through said formed aperture, and upsetting said portion over the opposite surface of said sheet material whereby to form a mechanical securement between said ornament and said plastic sheet material.

4. A method of making an ornamented plastic sheet assembly comprising the steps of supporting ornaments formed of thermoplastic resinous material in a retainer in a preselected spacing arrangement so that portions of said ornaments project upwardly of said retainer, superposing thermoplastic resinous sheet material on said ornaments, applying pressure thereto in a direction to urge said sheet material and ornaments into inter-engagement and heating said sheet material at the outer surface thereof by externally generated heat thereby automatically forming apertures in said sheet material to provide for the penetration of a portion of each ornament through its associated formed aperture, and upsetting said portions over said sheet material about said apertures, respectively, whereby to form a mechanical securement between said ornaments and said sheet material with said ornaments being disposed in said preselected arrangement on said sheet material.

5. A method of making an ornamented plastic sheet assembly, comprising the steps of supporting ornaments formed of thermoplastic resinous material in a retainer in a preselected spacing arrangement so that portions of said ornaments project upwardly of said retainer, superposing thermoplastic sheet material on said ornaments, applying a heated die to the outer surface of said sheet material with a heat conducting parting agent disposed therebetween thereby automatically forming openings through the sheet material having peripherally extending curled-over portions to provide for the penetration of a portion of each ornament through its associated opening, and upsetting said ornament portions over said curled-over portions, respectively, whereby to form a mechanical securement between said ornaments and said sheet material with said ornaments being disposed in said preselected spacing arrangement on said sheet material.

6. Ornamented material comprising a layer of thermoplastic resinous sheet material and an ornamental member superposed thereon, said ornamental member having a main body portion and portions of thermoplastic resinous material in fixed relation thereto and projecting rearwardly therefrom, said main body portion being disposed at the front of said layer, and said projecting portions being secured to said thermoplastic layer by extension therethrough in self made openings formed in said layer, the outer ends of said projections being upset in situ at the back of said layer forming portions overlying the said layer at the back thereof adjacent said openings, respectively.

7. Ornamented material comprising a layer of thermoplastic resinous sheet material and an ornamental member superposed thereon, said ornamental member having a main body portion and portions of thermoplastic resinous material at the edge of said main body portion and projecting rearwardly therefrom, said main body portion being disposed at the front of said layer, and said projecting portions being secured to said thermoplastic layer by extension therethrough in self made openings formed in said layer, the outer ends of said projections being upset in situ at the back of said layer forming portions overlying the said layer at the back thereof adjacent said openings, respectively.

8. A method of making an ornamented sheet assembly, comprising the steps of placing thermoplastic resinous sheet material and an ornament formed of thermoplastic resinous material in superposed relation, applying pressure thereto by means of a pressure member, with a sheet of parting-agent material disposed between said pressure member and said ornament and with said pressure member heated and exerting said pressure in a direction to urge said sheet material and ornament into interengagement at the outer surface thereof thereby automatically forming an aperture in said sheet material to provide for the extension of a portion of said ornament through said formed aperture of the sheet material, and upsetting said portion over said sheet material about said aperture whereby to form a mechanical securement between said ornament and said sheet material.

References Cited in the file of this patent

UNITED STATES PATENTS

| | | |
|---|---|---|
| 272,033 | Edge | Feb. 13, 1883 |
| 2,252,504 | Hahn | Aug. 12, 1941 |
| 2,302,342 | Nast | Nov. 17, 1942 |
| 2,397,743 | Kaphan | Apr. 2, 1946 |
| 2,470,963 | Weyl | May 24, 1949 |